July 24, 1962
L. VADAS
3,045,732
PEACH PITTER GRIPPING DEVICE
Filed May 6, 1959
4 Sheets-Sheet 1
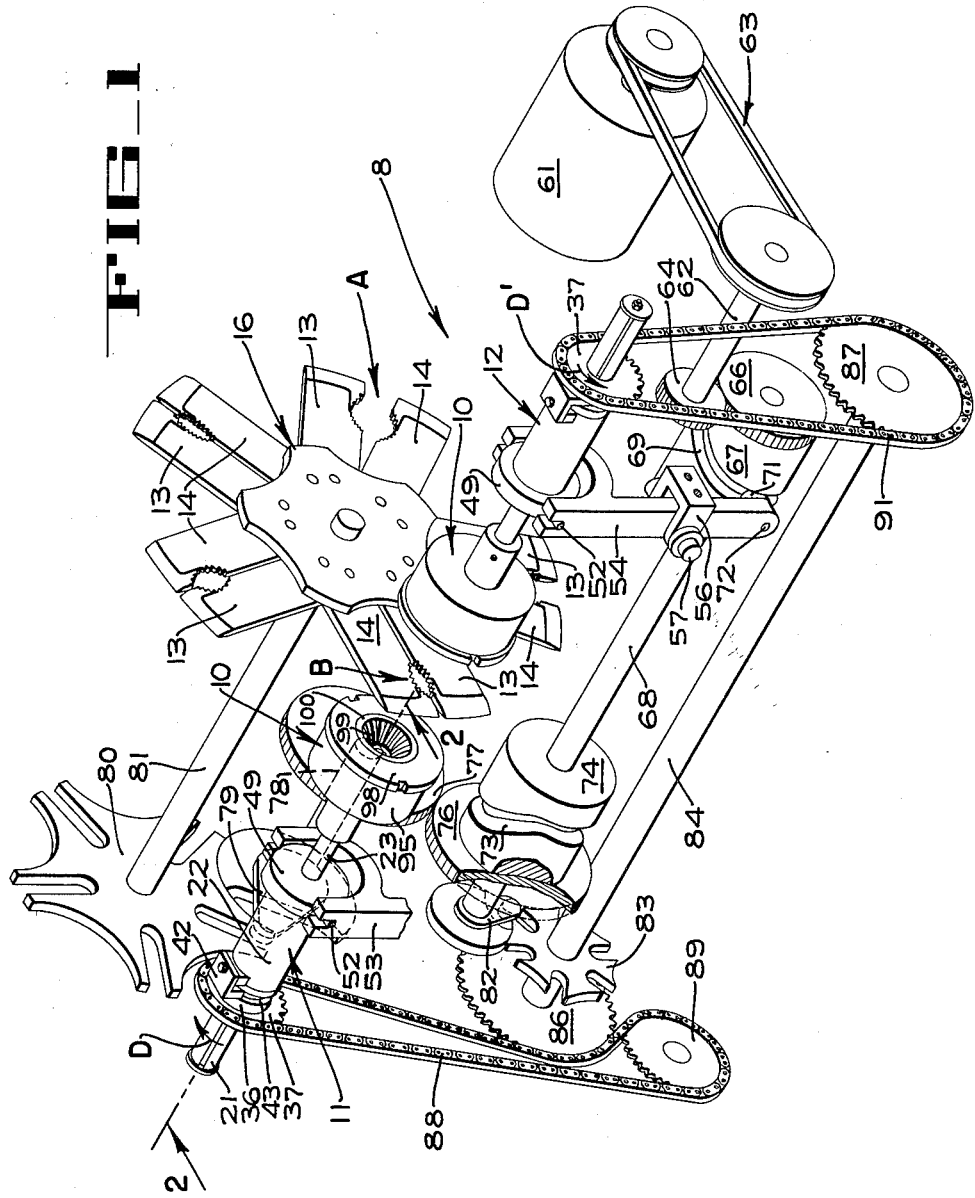
FIG_1
INVENTOR
LESLIE VADAS
BY Hans G. Hoffmeister
ATTORNEY July 24, 1962
L. VADAS
3,045,732
PEACH PITTER GRIPPING DEVICE
Filed May 6, 1959
4 Sheets-Sheet 2
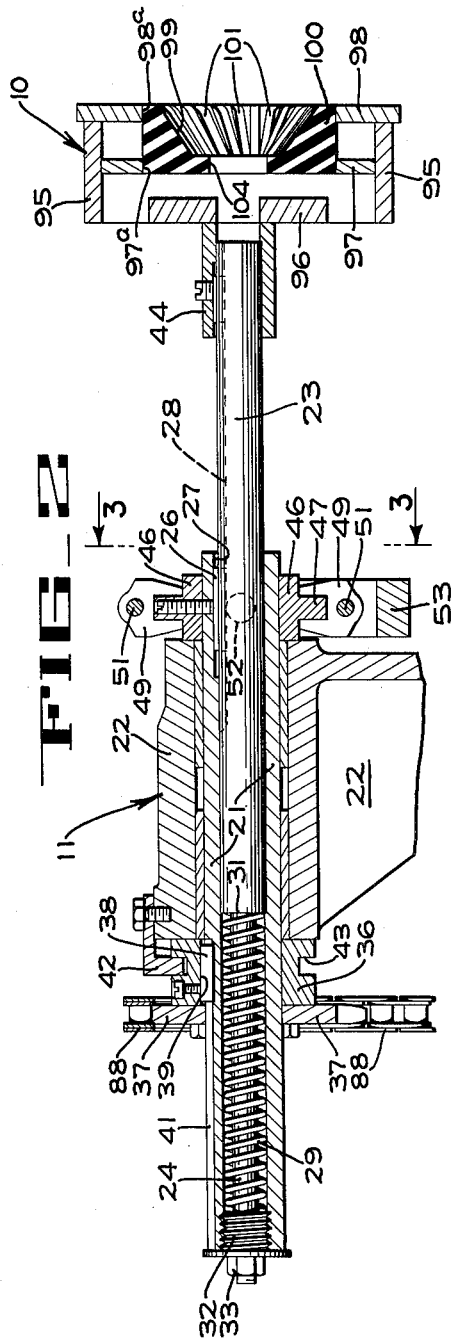
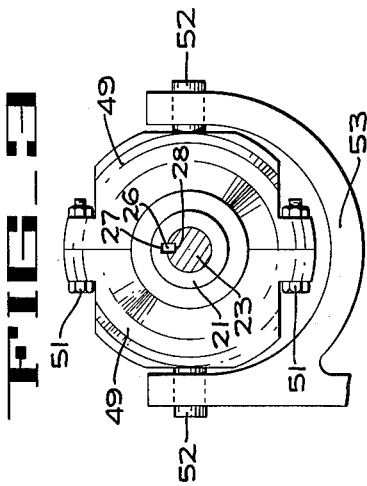
INVENTOR
LESLIE VADAS
BY *Hans G. Hoffmeister*
ATTORNEY July 24, 1962  L. VADAS  3,045,732
PEACH PITTER GRIPPING DEVICE
Filed May 6, 1959  4 Sheets-Sheet 3
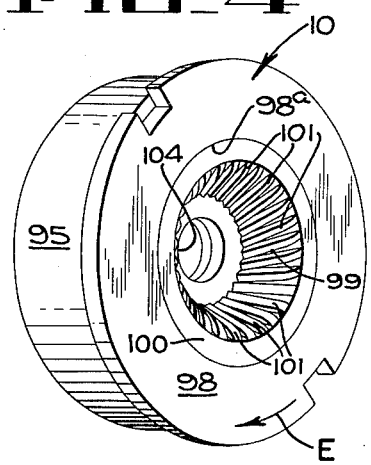
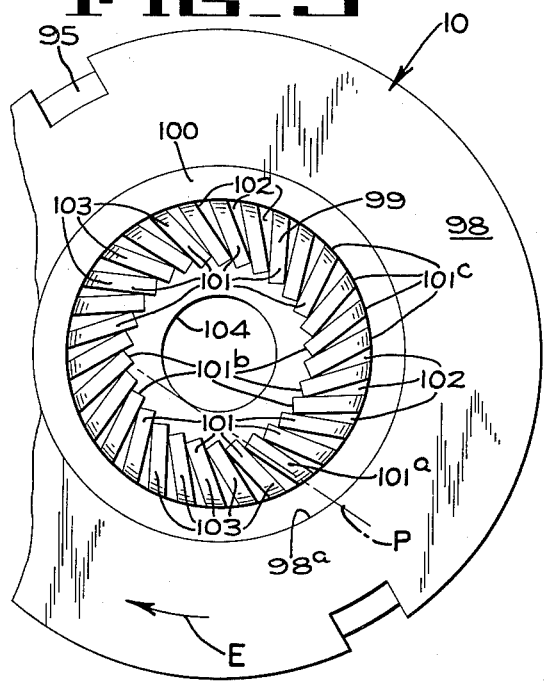
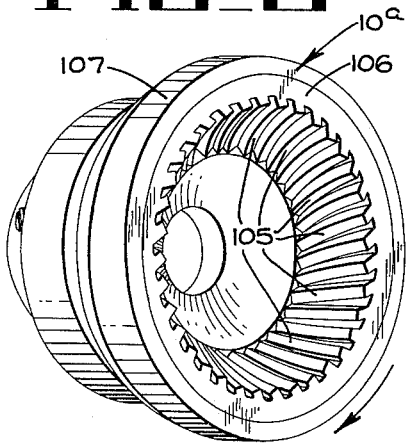
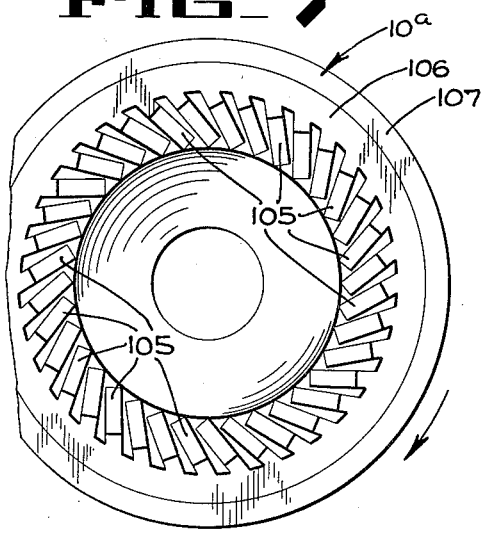
INVENTOR
LESLIE VADAS
BY *Hans G. Hoffmeister*
ATTORNEY

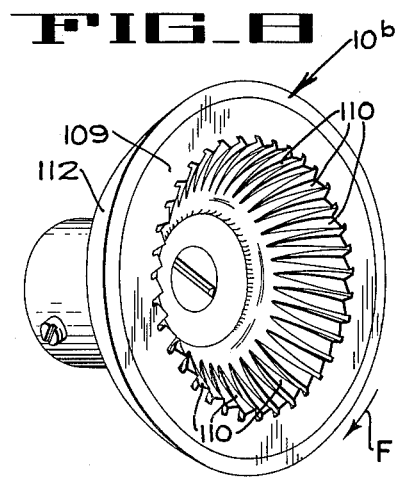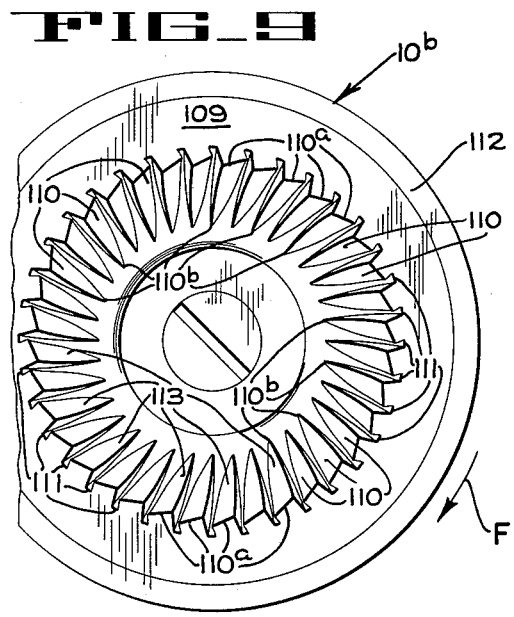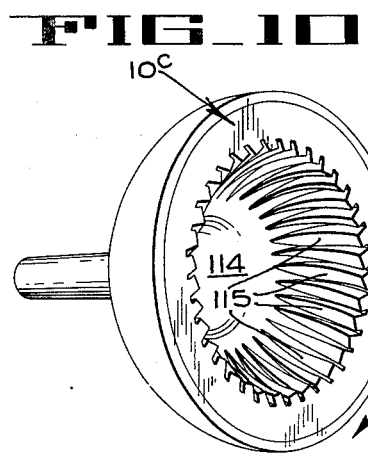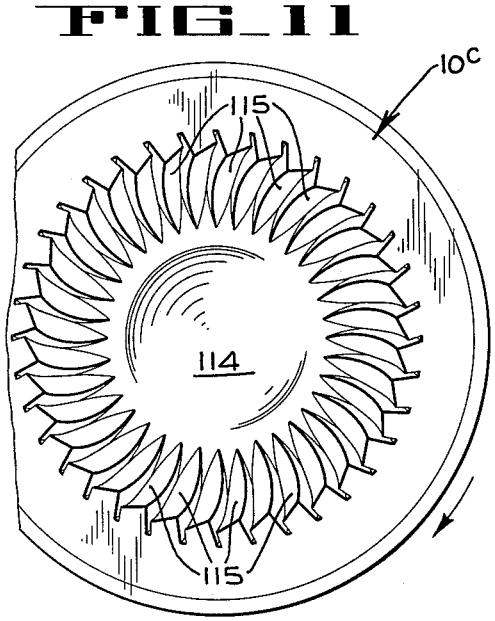

United States Patent Office 3,045,732
Patented July 24, 1962

3,045,732
PEACH PITTER GRIPPING DEVICE
Leslie Vadas, Los Gatos, Calif., assignor to FMC Corporation, a corporation of Delaware
Filed May 6, 1959, Ser. No. 811,410
6 Claims. (Cl. 146—28)

The present invention appertains to fruit preparation machines and more particularly relates to apparatus for gripping and twisting the halves of a peach free from the pit of the peach.

One object of the present invention is to provide an improved apparatus for gripping and twisting a peach half free from the pit of a peach while the pit is held in fixed position.

Another object is to provide fruit gripping cups having improved fruit gripping surfaces thereon.

These and other objects and advantages of the present invention will become apparent from the following description and the accompanying drawings, in which:

FIG. 1 is a diagrammatic perspective, with parts broken away, of a fruit preparation machine having a pair of twisting heads constructed in accordance with the teaching of the present invention.

FIG. 2 is an enlarged vertical section taken along lines 2—2 of FIG. 1.

FIG. 3 is a section taken along lines 3—3 of FIG. 2.

FIG. 4 is a perspective of a gripping cup used with the twisting heads shown in FIG. 1.

FIG. 5 is an enlarged elevation of a part of the cup of FIG. 4.

FIG. 6 is a perspective of a second embodiment of the gripping cut of the present invention.

FIG. 7 is an enlarged elevation of a part of the cup of FIG. 6.

FIG. 8 is a perspective of a third embodiment of the gripping cup.

FIG. 9 is an enlarged elevation of a part of the cup of FIG. 8.

FIG. 10 is a perspective of a fourth embodiment of the gripping cup.

FIG. 11 is an enlarged elevation of a part of the cup of FIG. 10.

The fruit preparation machine 8 (FIG. 1) of the present invention is of the type in which a pair of axially aligned, longitudinally spaced gripping cups 10, mounted in twisting heads 11 and 12, engage and twist peach halves from the peach pit while the pit is held in fixed position by cooperating pairs of blades 13 and 14 of a pit gripping assembly 16. A peach is placed on the blades 13 and 14 at a receiving station A when the blades are in an open position. As the assembly is intermittently indexed, the blades are closed to substantially bisect the peach and firmly grip the pit between the blades 13 and 14 before the peach reaches a twisting station B. Each peach is positioned on the blades at station A, and the blades are opened and closed, by any suitable mechanism such as that disclosed in the copending application for patent of Drake et al. Serial No. 691,620, which application is assigned to the assignee of the present invention.

After the peach has been indexed to station B, the twisting heads 11 and 12 are cammed towards each other, and the gripping cups 10 thereof are disposed around the adjacent halves of the peach to frictionally grip the same. The twisting heads 11 and 12 are then rotated in opposite directions to twist the peach halves free of the pit. Then the twisting heads 11 and 12 are moved away from each other, the separated peach halves and pits are released, and a new peach is indexed to station B.

Both twisting heads are identical, therefore, the description of the twisting head 11 (FIGS. 1 and 2) will serve to disclose the construction of both heads. The twisting head 11 comprises a tubular shaft 21 (FIG. 2) which is mounted for rotation and for axial sliding movement in a suitably bushed, stationary frame member 22 of the machine 8. A shaft 23, having a reduced diameter section 24, is received for axial sliding movement in the tubular shaft 21 but is held from rotation relative to said tubular shaft 21 by a key 26. The key 26 is locked in a keyway 27 in the shaft 21 and is slideably received in a keyway 28 in the shaft 23. A spring 29 is disposed around the reduced diameter section 24 of the shaft 23 and is positioned between a shoulder 31 on the shaft 23 and a threaded bushing 32 screwed into one end of the tubular shaft 21. The reduced diameter section 24 is slideable in the bushing 32 and has a nut 33 screwed on the end thereof to limit the amount of spring urged movement of the shaft 23 towards the right as viewed in FIG. 2.

A hub 36, having a sprocket 37 bolted thereon, is slideably mounted on the tubular shaft 21 but is held from rotation relative thereto by a key 38 which is locked in a keyway 39 in the hub 36 and is slideably received in a keyway 41 in the tubular shaft 21. An L-shaped guide 42 is bolted to the stationary frame member 22 and has an end portion received in an annular groove 43 in the periphery of the hub 36, thereby preventing the hub 36 from moving axially relative to the stationary member 22. It is apparent, therefore, that the sprocket 37, the tubular shaft 21 and the shaft 23 are all keyed together to rotate as a unit, and are all arranged to slide axially relative to each other. The gripping cup 10 is rigidly connected to the shaft 23 by any suitable means such as by being bolted or welded to a hub 44 that is keyed to the shaft 23.

In order to axially reciprocate the twisting head 11, a collar 46 having an outer annular flange 47 thereon is locked on the tubular shaft 21. The flange 47 is rotatably received in a groove in a split collar 49 (FIGS. 2 and 3), the halves of which are secured together by bolts 51. A pair of trunnion pins 52 in the split collar 49 is engaged by a yoke 53 (FIG. 1) which is pivotally mounted on a frame member (not shown). Pivotal actuation of the yoke 53 in one direction moves the reciprocable parts of the twisting head 11 toward the pit gripping assembly 16, and pivotal actuation of the yoke 53 in the opposite direction moves the twisting head 11 away from the assembly 16. Likewise, the trunnion pins 52 (FIG. 1) in the collar 49, associated with the twisting head 12, are engaged by a yoke 54 which is pivotally mounted on a stationary frame member 56 by a pin 57. The yoke 54 is pivotally actuated in timed relation with the yoke 53, by structure to be described, presently, in such a way that the twisting heads 11 and 12 are moved towards each other at the same time to frictionally engage the peach halves, and are moved away from each other at the same time to release the peach halves.

After the twisting heads 11 and 12 have moved their gripping cups 10 into position to grip the peach halves, the sprockets 37 of the twisting heads 11 and 12 are rotated in opposite directions to twist the peach halves free from their pit.

The drive mechanism for rotating the twisting heads 11 and 12 and for moving the same towards and away from each other is shown in FIGURE 1. The drive mechanism comprises a motor 61 arranged to drive a shaft 62 by means of a belt and pulley drive 63. A gear 64 keyed to the shaft 62 is in mesh with a gear 66 formed on a cylindrical cam 67 that is keyed to a shaft 68. The cam 67 has a camming groove 69 which receives a roller follower 71 rotatably mounted on a pin 72 on the lower end of the yoke 54. As the cylindrical cam 67 is rotated, the yoke 54 will be pivoted to move the twisting head 12 toward and away from the twisting station B.

The twisting head 11 is reciprocated due to pivotal movement of its associated yoke 53 which has a roller follower (not shown) disposed in a camming groove 73 of a second cylindrical cam 74 that is keyed to the shaft 68. The camming grooves of the cylindrical cams 67 and 74 are so arranged that the twisting heads are reciprocated simultaneously but in opposite directions.

A gear 76 is integrally formed on the cam 74 and is disposed in mesh with a gear 77 keyed to a shaft 78. A Geneva driver 79 is also keyed to the shaft 78 and is arranged to intermittently index a Geneva gear 80 that is keyed to a shaft 81 on which the pit gripping assembly 16 is secured. Thus, the pit gripping assembly 16 is indexed in timed relation with the reciprocation of the twisting heads 11 and 12.

A Geneva driver 82 is keyed to the shaft 68 and is arranged to intermittently index a Geneva gear 83 that is keyed to a shaft 84 on which two sprockets 86 and 87 are keyed. The sprocket 86 drives the sprocket 37 of the twisting head 11 through a chain 88 which is also trained around an idler sprocket 89. The sprocket 87 drives the sprocket 37 of the twisting head 12 through a chain 91. Due to the use of the idler sprocket 89, the sprockets 37 of the twisting heads 11 and 12 are rotated in opposite directions, as indicated by the arrows D and D' in FIG. 1, so that the peach halves engaged by the cups 10 will be twisted in opposite directions. Since the same motor intermittently drives the pit gripping assembly 16 and intermittently reciprocates and rotates the twisting heads 11 and 12, it is apparent that these parts are driven in timed relation.

The construction of the particular gripping cups 10 shown mounted on the machine in FIGURE 1 is best illustrated in FIGS. 4 and 5. This cup 10 is arranged to handle very firm fruit and comprises a support member in the form of a cylindrical housing 95 (FIG. 2) having a transverse strap 96 to which the hub 44 is secured, and two annular walls 97 and 98 having aligned openings 97a and 98a, respectively. A resilient insert 100 of rubber or similar material is anchored, as by bonding, in the aligned openings 97a and 98a in the walls 97 and 98. The cup 10 (FIG. 4) has a generally hemispherical fruit-receiving recess 99 into which a plurality of intergrally-formed gripping ribs 101 project. The ribs 101 are of equal width throughout their length, and each rib is spaced from adjacent ribs by V-shaped grooves 102. The ribs 101, when in their unstressed condition, are not disposed in radial planes passing through the axis of the cup but are canted in the direction of rotation of the cup 10 which is indicated by arrow E. For example, rib 101a (FIG. 5) is disposed in a plane P that is substantially tangent to a central opening 104 of the cup. The surfaces 103 of the ribs, which surfaces engage the fruit are normal to the body of the ribs 101, are inclined relative to their direction of movement and are arranged to form a plurality of gripping steps which engage the fruit. The inclination of the axially outer surfaces 103 of the ribs is such that the trailing edges of the ribs project axially outward farther than do the leading edges. Thus, if the ribs are deflected circumferentially because of frictional contact with the fruit, the leading edges of the ribs do not bruise or cut into the flesh of the fruit. Due to the cup-shaped configuration of the fruit receiving recess 99, the ribs 101 have an axial extent and hence are also angled relative to the axis of rotation of the cup 10 in such a way that the inner ends 101b of each rib lead the outer ends 101c when the cup 10 is rotated. This lead causes debris, such as small particles of peach skins which may enter the V-shaped grooves 102, to be forced outwardly toward the wide ends of the grooves 102 thereby preventing clogging of the same.

The cup 10a, which in FIGURES 6 and 7, is substantially the same as the cup 10 but is particularly adapted for use with fruit which is both larger in diameter and softer than the fruit processed by the cup 10. Because the peach halves are more easily twisted from the pit of the softer peach, ribs 105 of an insert 106 of cup 10a do not extend inwardly toward the axis of the cup as far as the ribs 101 extend toward the axis of cup 10. Also, since the flesh of the peach is softer and hence more easily injured, the rubber is of a softer type in order to reduce injury to the fruit to a minimum. The insert 106 is bonded to a segmental spherical housing or support member 107 in any suitable manner and is adapted to be coupled to the support shaft 23 (FIG. 1) of the machine.

In FIGURES 8 and 9, and 10 and 11, cups 10b and 10c, respectively, are provided for use with relatively soft fruit and are of similar design. The cup 10b (FIGS. 8 and 9) has a resilient cup-shaped insert 109 secured in a housing 112 and having a plurality of V-shaped ribs 110 which are separated from each other adjacent the large diameter portion of the cup by slits 111. The ribs 110 are canted in the direction of rotation of the cup 10b and present to the fruit inwardly directed fruit gripping surfaces 113 in the form of a plurality of steps. As shown in the drawings, the inclined gripping surfaces 113 blend into the body of the insert 109 near the center of the insert to define the above mentioned V-shape of the ribs 110. The ribs 110 are arranged in the cup 10b so that the large diameter end 110a (FIG. 9) leads the small diameter end 110b when the cup is rotated in the direction of arrow F.

The cup 10c (FIGS. 10 and 11) is substantially the same as the cup 10b but has a deeper fruit receiving recess 114 and the ribs 115 are longer and thereby engage more of the surface of the peach.

Each of the cups 10, 10a, 10b and 10c are adapted to be used in the twisting heads 11 and 12 and each is arranged to grip the peach in substantially the same way. When a cup, for example, the cup 10a shown in FIGS. 6 and 7, is moved into firm engagement with a peach half, the ribs 105 are disposed substantially as shown in the drawings. When the cup 10 is rotated in the direction of the arrows E in FIGS. 4 and 5 against the resistance of the peach half, the ribs 101 are deflected from their canted position to a more nearly radial position. In this way, the more the peach half resists rotation, the more the ribs tend to assume a radial position and hence to increase their grip on the peach half.

In the operation of the fruit preparation machine 8 (FIG. 1), a peach to be pitted is delivered to the twisting station B with its flesh bisected to the pit and with the pit firmly gripped between the blades 13 and 14. While the peach is held in this position, the twisting heads 11 and 12 are moved inwardly through the action of the cylindrical cams 74 and 67, the camming grooves 73 and 69 of which are provided with dwell portions adapted to hold the heads at the twisting station B until the twisting operation has been completed.

The cups 10 on the twisting heads 11 and 12 are then rotated in opposite directions by the action of the Geneva driver 82 and the other drive parts connected to the heads 11 and 12. As the cups 10 begin to rotate, the ribs 101 tend to straighten from their canted position to thereby grip the peach with increasing force until the peach halves are twisted from the pit. The cylindrical cams 74 and 67 then move the heads 11 and 12 away from the station B allowing the peach halves to fall free from the pit and from the cups. The pit falls free from the blades 13 and 14 when the same are opened after being moved away from the station B.

From the foregoing description it is apparent that the fruit preparation machine of the present invention includes several embodiments of gripping cups which adapt the machine for use with peaches of different size and of different firmness. Each cup is provided with resilient ribs which are canted in the direction of rotation of the cup when the ribs are in their unstressed condition and are deflected toward radial positions to cause the ribs to grip the peach with increasing strength as the resistance to the twisting of the peach increases.

While several embodiments of the present invention have been shown and described, it will be understood that various changes and modifications may be made without departing from the spirit of the invention or the scope of the appended claims.

Having thus described the invention, what is claimed as new and for which Letters Patent is desired is:

1. In an apparatus for pitting a peach having its pit held in fixed position, a gripper cup comprising a housing, a resilient insert secured in said housing and defining a substantially hemispherical fruit receiving cavity, a plurality of resilient V-shaped fruit gripping ribs integral with said insert and extending from the outer edges of the cavity toward the center thereof to engage a peach disposed in said cavity, and means for rotating said housing in a predetermined direction, each of said ribs having an end adjacent the outer edges of said cavity which leads the end disposed adjacent the center of the cavity during rotation of said housing in said predetermined direction.

2. In an apparatus for pitting a peach having its pit held in fixed position, a gripper cup comprising a housing, a resilient insert secured in said housing and defining a substantially hemispherical fruit receiving cavity, a plurality of resilient fruit gripping ribs integral with and projecting inwardly from said insert into said cavity and extending from the outermost edge of said cavity toward the center thereof, and means for rotating said housing in a predetermined direction, each of said ribs having an end adjacent the outer edges of said cavity trailing the end disposed adjacent the center thereof during rotation of said housing in said predetermined direction, and each rib being spaced from the next adjacent rib by a V-shaped groove with the larger end of the groove disposed adjacent the outer edge of said cavity.

3. A gripping device for a fruit pitting machine comprising a housing, means mounting said housing for rotation in one direction, and an insert of rubberlike material secured in said housing, said insert having a substantially hemispherical fruit receiving concavity, the wall of said concavity bearing a plurality of fruit gripping ribs, each of said ribs extending generally radially outwardly from a zone adjacent the bottom of the cavity but being canted away from a true radial plane, the outer surfaces of said ribs defining an interrupted concave fruit gripping surface, the direction of said canting of the ribs from a radial plane being such that the ribs are deflected toward a truly radial position by the resistance to rotation of a fruit gripped by said ribs that occurs during rotation of the housing.

4. Apparatus for pitting a peach comprising means for holding the pit of a peach, a gripping device for the peach comprising a housing, means mounting said housing for rotation, means for rotating said housing in one direction, an insert of rubberlike material secured in said housing said insert having a substantially hemispherical fruit receiving concavity, the wall of said concavity bearing a plurality of fruit gripping ribs, each of said ribs extending generally radially outwardly from a zone adjacent the bottom of the cavity but being canted away from a true radial plane with the radially inner ends of said ribs leading the radially outer ends in the direction of housing rotation, the axially outer surfaces of said ribs defining an interrupted concave fruit gripping surface, said ribs being deflected toward a truly radial position by the resistance to rotation of a fruit gripped by said ribs during rotation of the housing to automatically increase the grip on the peach in proportion to resistance of the peach to rotation.

5. A fruit gripping device for a fruit pitter comprising a housing, means for mounting said housing for rotation, and a gripper member mounted in said housing formed of rubberlike material and having a concave fruit receiving wall, said wall bearing a plurality of generally radial flexible ribs disposed in spaced relation about the axis of rotation, the outwardly facing surfaces of said ribs defining an interrupted concave fruit gripping surface, said ribs progressively decreasing in width from their radially outer to their radially inner ends.

6. Apparatus for pitting a peach comprising means for holding the pit of a peach, a gripping device for the peach comprising a housing, means mounting said housing for rotation, means for rotating said housing in one direction, an insert of rubberlike material secured in said housing said insert having a substantially hemispherical fruit receiving concavity, the wall of said concavity bearing a plurality of fruit gripping ribs, each of said ribs extending generally radially outwardly from a zone adjacent the bottom of the cavity, the axially outer surfaces of said ribs defining an interrupted concave fruit gripping surface, said surfaces being inclined so that the trailing edges of the ribs project axially outward past the leading edges of the ribs.

References Cited in the file of this patent

UNITED STATES PATENTS

| | | |
|---|---|---|
| 129,632 | Washburn | July 16, 1872 |
| 1,115,754 | Walker | Nov. 3, 1914 |
| 1,545,216 | Thompson | July 7, 1925 |
| 2,147,870 | Watkins | Feb. 21, 1939 |
| 2,444,298 | Kline | June 29, 1948 |
| 2,464,307 | Griffin et al. | Mar. 15, 1949 |
| 2,775,279 | Perrelli | Dec. 25, 1956 |